United States Patent
Engel et al.

(10) Patent No.: US 9,920,433 B2
(45) Date of Patent: Mar. 20, 2018

(54) ADDITIVE METAL DEPOSITION PROCESS

(71) Applicant: Incodema3D, LLC, Ithaca, NY (US)

(72) Inventors: Kevin Engel, Ithaca, NY (US); Scott Volk, Ithaca, NY (US); Jerry Rushak, Cortland, NY (US); Peter Engel, Walworth, NY (US)

(73) Assignee: Incodema3D, LLC, Ithaca, NY (US)

( * ) Notice: Subject to any disclaimer, the term of this patent is extended or adjusted under 35 U.S.C. 154(b) by 105 days.

(21) Appl. No.: 14/594,418

(22) Filed: Jan. 12, 2015

(65) Prior Publication Data

US 2015/0197862 A1    Jul. 16, 2015

Related U.S. Application Data

(60) Provisional application No. 61/926,686, filed on Jan. 13, 2014.

(51) Int. Cl.
  *C23F 1/30*    (2006.01)
  *B22F 3/10*    (2006.01)
  (Continued)

(52) U.S. Cl.
  CPC .......... *C23F 1/30* (2013.01); *B22F 3/10* (2013.01); *B22F 3/1055* (2013.01); *B22F 3/24* (2013.01); *B23K 31/02* (2013.01); *B23K 37/00* (2013.01); *C22C 14/00* (2013.01); *C22C 19/03* (2013.01); *C22C 38/00* (2013.01); *C22C 38/18* (2013.01); *C23F 1/04* (2013.01); *C23F 1/08* (2013.01);
  (Continued)

(58) Field of Classification Search
  CPC ......... B33Y 10/00; B33Y 30/00; B33Y 40/00; B33Y 80/00; B22F 2003/1056; B22F 2003/1058; B22F 2003/241; B22F 3/10; B22F 3/1055; B22F 3/24; C23F 1/04; C23F 1/08; C23F 1/28; C23F 1/30
  USPC ............................................................ 75/246
  See application file for complete search history.

(56) References Cited

U.S. PATENT DOCUMENTS 3,053,720 A * 9/1962 Edds .................... C23F 1/02
                                                                      134/21
5,141,680 A    8/1992 Almquist et al.
(Continued)

FOREIGN PATENT DOCUMENTS

DE    19954891    * 5/2001
EP    1683593    7/2006
(Continued)

OTHER PUBLICATIONS

Schwartz, M. "Innovations in materials manufacturing, fabrication, and environmental safety." 2001. CRC Press. p.350.*

(Continued)

*Primary Examiner* — Colleen P Dunn
*Assistant Examiner* — Nicholas A Wang
(74) *Attorney, Agent, or Firm* — Fish & Richardson P.C.

(57) ABSTRACT

A build piece is made from a build plan by an additive metal deposition process, the build plan created from a three dimensional definition of a desired part, the build plan having a first set of dimensions corresponding to the desired part and includes a support structure. The build piece is to a chemical etchant such that the support structure is removed from the build piece and the dimensions of the build piece corresponding to the desired part are reduced to a second set of dimensions.

31 Claims, 7 Drawing Sheets

(51) Int. Cl.

| | | |
|---|---|---|
| *B22F 3/24* | (2006.01) | |
| *B23K 31/02* | (2006.01) | |
| *B23K 37/00* | (2006.01) | |
| *C22C 14/00* | (2006.01) | |
| *C22C 19/03* | (2006.01) | |
| *C22C 38/00* | (2006.01) | |
| *C22C 38/18* | (2006.01) | |
| *C23F 1/08* | (2006.01) | |
| *C23F 1/28* | (2006.01) | |
| *B22F 3/105* | (2006.01) | |
| *C23F 1/04* | (2006.01) | |
| *B33Y 10/00* | (2015.01) | |
| *B33Y 30/00* | (2015.01) | |
| *B33Y 40/00* | (2015.01) | |
| *B33Y 80/00* | (2015.01) | |

(52) U.S. Cl.
CPC ........ *C23F 1/28* (2013.01); *B22F 2003/1056* (2013.01); *B22F 2003/1058* (2013.01); *B22F 2003/241* (2013.01); *B33Y 10/00* (2014.12); *B33Y 30/00* (2014.12); *B33Y 40/00* (2014.12); *B33Y 80/00* (2014.12); *Y02P 10/295* (2015.11)

(56) References Cited

U.S. PATENT DOCUMENTS

| | | | | |
|---|---|---|---|---|
| 5,893,983 A | * | 4/1999 | Konrad | ..................... B24B 7/06 216/105 |
| 2011/0256416 A1 | | 10/2011 | Brancher et al. | |
| 2012/0018115 A1 | | 1/2012 | Hövel et al. | |
| 2013/0312928 A1 | * | 11/2013 | Mercelis | ............... B22F 3/1055 164/492 |

FOREIGN PATENT DOCUMENTS

| | | | |
|---|---|---|---|
| JP | 2011005667 | * | 1/2011 |
| WO | WO 2012/131481 | | 10/2012 |

OTHER PUBLICATIONS

Despa V., et al., *Study of Selective Laser Sintering—A qualitative and Objective Approach*, The Scientific Bulletin of Valahia University—Materials and Mechanics—Nr. 6 (year 9) 2011, 6 pages.

'3D Printing: Understanding Support Material' [online]. Product Design & Development 2012, [retrieved on Oct. 27, 2013]. Retrieved from the Internet: <URL: http://www.pddnet.com/blogs/2012/07/3d-printing-understanding-support-material>.

Santos, Edson Costa et al., *Rapid manufacturing of metal components by laser forming*, International Journal of Machine Tools & Manufacture, 46(2006), pp. 1459-1468.

'DMLS' [online]. Forecast3D 2013, [retrieved on Oct. 27, 2013]. Retrieved from the Internet: <URL: http://www.forecast3d.com/dmls.html>.

'Selective Laser Sintering (SLS)'. Nova Product Development Services Ltd., 2013, [retrieved on Oct. 27, 2013]. Retrieved from the Internet: <URL: http://www.novaproduct.com/index.php/main/services#4>.

International Search Report and Written Opinion dated Mar. 26, 2015 dated Mar. 26, 2015 in International Appln. No. PCT/US2015/011009.

* cited by examiner

ADDITIVE METAL DEPOSITION PROCESS

CROSS-REFERENCE TO RELATED APPLICATIONS

Pursuant to 35 U.S.C. § 119(e), this application claims priority to U.S. Provisional Application Ser. No. 61/926,686, filed Jan. 13, 2014, the contents of which are hereby incorporated by reference.

TECHNICAL FIELD

This document relates to additive metal deposition processes, as well as articles made by such processes.

BACKGROUND

Additive manufacturing is a process of manufacturing whereby a build piece is created by adding a manufacturing medium (e.g., a metal) to a part, as opposed to removing media to create the part. Examples of additive manufacturing include, but are not limited to, i) additive metal deposition manufacturing, sometimes called powder bed fusion, where a laser or other heat source sinters or melts a metal medium; ii) stereolithography, where a light source cures a photopolymer; and iii) fused deposition modeling, where a thermoplastic is extruded and cools to harden.

Many instances of additive manufacturing call for support structures to be built with the build piece. The support structures may be used, for example, to support overhangs or other geometry in the build piece that is not supported by lower layers of the build piece's geometry.

SUMMARY

In one aspect, a method includes creating a build piece from a build plan by an additive metal deposition process, the build plan created from a three dimensional definition of a desired part, the build plan having a first set of dimensions corresponding to the desired part and includes a support structure. The method further includes subjecting the build piece to a chemical etchant such that the support structure is removed from the build piece and the dimensions of the build piece corresponding to the desired part are reduced to a second set of dimensions.

Implementations can include any, all, or none of the following features. The method including receiving the three dimensional definition of the desired part; and generating the build plan using the three dimensional definition. The method including removing the etchant from the part; and finishing the part by applying at least one finishing process to the part after removing the etchant from the part. The build piece further includes one or more support interfaces. Subjecting the build piece to a chemical etchant removes the support interfaces. Subjecting the build piece to a chemical etchant includes controlling a temperature of the chemical etchant. Subjecting the build piece to a chemical etchant includes agitating the chemical etchant. The chemical etchant etches the structural support faster than the rest of the build piece. The support structure has greater porosity than the rest of the build piece. The piece further includes one or more support interfaces that are narrower than the support structure. The build piece contains a cavity and a port, at least a portion of the support structure is created in the cavity, and the chemical etchant reaches the portion of the support structure in the cavity by entering the cavity through the port. Subjecting the build piece to a chemical etchant includes subjecting the build piece to a chemical etchant for a determined exposure duration; and the method further includes determining the exposure duration from at least one variable selected from the group consisting of a type of chemical etchant, a temperature of the chemical etchant, an agitation of the chemical etchant, a geometric measure of the support structure, an etchant reactivity of the support structure; a porosity of the support structure, and a material of the build piece. The second set of dimensions are smaller than the first set of dimensions by a sacrificial thickness; and the method further includes determining the sacrificial thickness from at least one variable selected from the group consisting of the type of chemical etchant, the temperature of the chemical etchant, the agitation of the chemical etchant, a geometric measure of the support structure, the porosity of the support structure, a material of the build piece, and the determined exposure duration. The build piece is made from one of the group consisting of steel, stainless steel, and Inconel; and the etchant is ferric chloride with HCl. The build piece is made from titanium and the etchant is hydrofluoric and hydrochloric acid. The build piece is subjected to the etchant by an automated material handler in response to a detection that the build piece has been created. Subjecting the build piece to the chemical etchant improves the finish of the build piece.

In one aspect, a system includes a direct metal printer configured to create a build piece from a build plan by an additive metal deposition process, the build plan created from a three dimensional definition of a desired part, the build plan having a first set of dimensions corresponding to the desired part and includes a support structure. The system further includes an etchant bath configured to subject the build piece to a chemical etchant such that the support structure is removed from the build piece and the dimensions of the build piece corresponding to the desired part are reduced to a second set of dimensions.

In one aspect, an article of manufacture is created by a method includes creating a build piece from a build plan by an additive metal deposition process, the build plan created from a three dimensional definition of a desired part, the build plan having a first set of dimensions corresponding to the desired part and includes a support structure. The method further includes subjecting the build piece to a chemical etchant such that the support structure is removed from the build piece and the dimensions of the build piece corresponding to the desired part are reduced to a second set of dimensions. In one aspect, a method includes creating a build piece from a build plan by an additive metal deposition process, the build plan includes a three dimensional definition of a part, a three dimensional definition of a support structure for the part, and a three dimensional definition of a sacrificial layer around the part the build piece, the build piece includes the part, the support structure, and the sacrificial layer around the part. The method further includes subjecting the build piece to a chemical etchant such that the support structure and the sacrificial layer are removed from the part. a method includes creating a build piece from a build plan by an additive metal deposition process, the build plan includes a three dimensional definition of a part, a three dimensional definition of a support structure for the part, and a three dimensional definition of a sacrificial layer around the part the build piece, the build piece includes the part, the support structure, and the sacrificial layer around the part. The method further includes subjecting the build piece to a chemical etchant such that the support structure and the sacrificial layer are removed from the part.

Implementations can include any, all, or none of the following features. The method including receiving the three dimensional definition of the part; and generating the build plan for the part from the three dimensional definition of the part. The method including removing the etchant from the part; and finishing the part by applying at least one finishing process to the part after removing the etchant from the part. Build plan for the part further includes one or more support interfaces. Subjecting the build piece to a chemical etchant removes the support structure from the part by removing the support interfaces. Subjecting the build piece to a chemical etchant includes controlling a temperature of the chemical etchant. Subjecting the build piece to a chemical etchant includes agitating the chemical etchant. The support structure is more porous than the part and wherein the chemical etchant etches the structural support faster than the part. The part contains a cavity and a port, at least a portion of the support structure is created in the cavity, and the chemical etchant reaches the portion of the support structure in the cavity by entering the cavity through the port. Subjecting the build piece to a chemical etchant includes subjecting the build piece to a chemical etchant for a determined exposure duration; and wherein the method further includes determining the exposure duration from at least one of the group consisting of a type of chemical etchant, a temperature of the chemical etchant, an agitation of the chemical etchant, a geometric measure of the support structure, a porosity of the support structure, and a material of the build piece. The three dimensional definition of the sacrificial layer has a determined thickness; and wherein the method further includes determining the thickness of the three dimensional definition of the sacrificial layer from at least one of the group consisting of the type of chemical etchant, the temperature of the chemical etchant, the agitation of the chemical etchant, a geometric measure of the support structure, the porosity of the support structure, a material of the build piece, and the determined exposure duration. The build piece is made from one of the group consisting of steel, stainless steel, and Inconel; and the etchant is ferric chloride with HCl. The build piece is made from titanium and the etchant is hydrofluoric and hydrochloric acid. The build piece is subjected to the etchant by an automated material handler in response to a detection that the build piece has been created.

Implementations may include one or more of the following advantages. By etching a build piece that includes support structures, the support structures can be removed and the surface of the build piece can be at least partially finished in a single process. Subjecting a build piece to an etching process to remove support structures may often be less operator-time intensive than other processes that remove support structures such as mechanical cutting, clipping, or filing. A single operator may subject many build pieces to an etching process at once as opposed to processing them one at a time. A computer can be configured to automatically modify a three dimensional representation of a desired part to i) enlarge the part's dimensions and ii) attach a three dimensional representation of an appropriate support structure to the enlarged dimensions of the piece. By subjecting a build piece to a chemical etchant, support structures of the build piece may be removed even if those support structures are difficult to access.

DESCRIPTION OF DRAWINGS

Like reference symbols in the various drawings indicate like elements

DETAILED DESCRIPTION

A build piece can be created from a build plan by an additive metal deposition process (e.g., an additive metal deposition process). The build plan can be created starting from a definition of a desired part and then modified in two ways. The definition of the desired part can be enlarged and support structures needed for manufacturing the piece can be added. Once created, the build piece may be subject to a chemical etchant. This etching process can modify the build piece in two ways. The etching can remove the support structures from the build piece and the etching can reduce the size of the build piece. In some cases, the etching process can turn the build piece into the desired part, or it can be one of a number of steps used to turn the build piece into the desired part. Example parts can include, but are not limited to, automotive turbo components, impellers, tubes, and other hollow parts.

Figure 1:
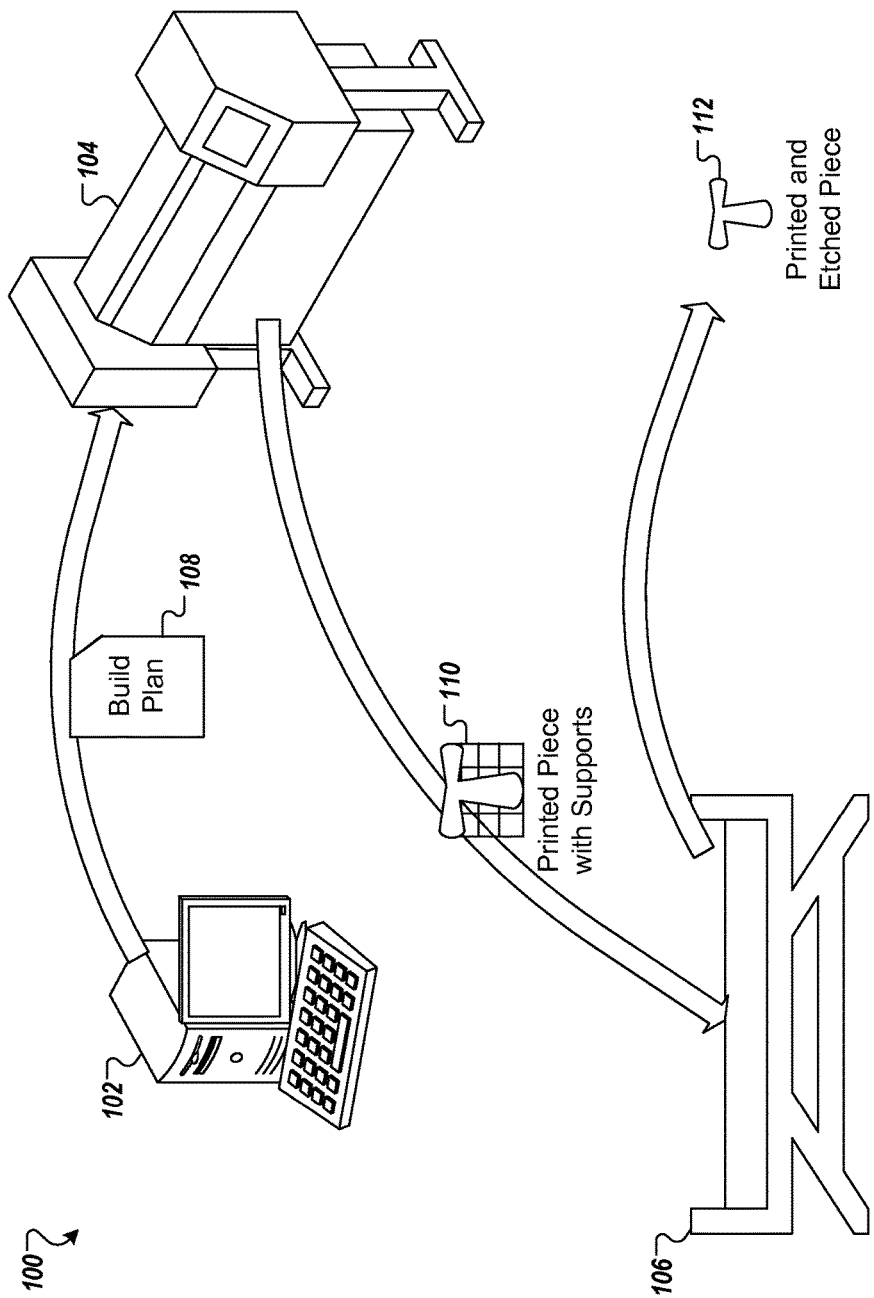
FIG. 1 shows a system for processing pieces created via an additive metal deposition process.

FIG. 1 shows an exemplary system 100 for processing pieces created via an additive metal deposition process. The system 100 can include, but is not limited to, a computer system 102, a direct metal printer 104, and an etchant bath 106. In general, the system 100 may be used to design, print, and etch a desired manufactured part.

The computer system 102 can include any type of appropriate computing hardware and software used to design a part to be created by an additive metal deposition process. For example, the computer system 102 may include one or more computers loaded with computer aided drafting (CAD) programs. A user may use these programs to load, create, or modify a three dimensional (3D) definition of a desired part. In some implementations, the computer system 102 can include multiple computers or work stations networked together via a computing network. A desktop computer is shown, but different or additional computer types may be included in the computer system 102. These may include, but are not limited to, laptops, mobile computing devices, network servers, and distributed application servers (sometimes known as cloud service providers).

Using the CAD application or another application, the same user or a different user may create a build plan 108 for the desired part. In some implementations, the build plan 108 can be created my modifying the 3D definition of the desired part. The build plan 108 can include an enlargement of the 3D definition of the desired part and can include a support structure. The build plan 108 may also be split into layers according to a format used by the direct metal printer 104. In some implementations, the build plan may be one or more data files that conform to the Standard Tessellation Language (STL), Additive Manufacturing File Format (ASTM), Polygon File Format (PLY), or other well-known or custom formats. The build plan 108 can be loaded into the direct metal printer 104. For example, the computer system 102 can communicate the build plan 108 to the direct metal printer 104 via a computer network or a human user may transport the build plan 108 on a removable computer readable medium such as a compact disk (CD) or removable memory stick.

Once the direct metal printer 104 has received the build plan 108, the direct metal printer 104 can create a build piece 110 (e.g., a printed piece with supports) from the build plan 108. The direct metal printer 104 can be configured to manufacture metal pieces from a powdered metal or similar build medium. In some cases, the direct metal printer 104 includes a computer controlled laser that sinters or melts a layer of build media into a solid piece according to a loaded build plan 108. The direct metal printer 104 may then add a layer of build media over the solid piece. This layer-wise process may be repeated until the build piece 110 specified by the build plan 108 is created.

Other types of additive manufacturing machines may produce build pieces that interact with chemical etchants, and these machines may be used. For example, some stereolithography machines may use a build media that reacts to some chemical etchants, and such a machine may be used in the system 100.

The build piece 110 can be placed in the etchant bath 106 and subjected to an etching process to produce a printed and etched piece 112. The etchant bath 106 may include a basin or other appropriate container for holding a chemical etchant. The type of chemical etchant held by the etchant bath 106 may be used to determine the type of material the etchant bath 106 is constructed from. For example, if the chemical etchant is an acid, the basin of the etchant bath 106 may be made from a non-reactive polymer and may include a lid and fume removal vent (not shown).

The etchant bath 106 may be constructed to hold more than one build piece 110. For example, a shop may have multiple (e.g., two or more such as ten) direct metal printers 104 creating the same or different build pieces. The etchant bath 106 may be large enough, and contain enough etchant, to process these build pieces at once. The etchant bath 106 may include jigs or other hardware (not shown in FIG. 1) to hold the build piece 110. In some cases, the jigs may be constructed to only touch the build piece 110 on the support structure, which may ensure that the portions of the build piece 110 that correspond to the desired part are fully exposed to the chemical etchant.

The type of etchant in the etchant bath 106 may be selected based on the type of material used to create the build piece 110. For example, the build piece 110 may be created from metal such as aluminum, titanium, stainless steel, tool steel, Inconel, astaloy, or a combination thereof. For these types of build pieces, an acidic etchant such as ferric chloride with HCl for steel, stainless steel, and Inconel or hydrofluoric and hydrochloric acid titanium may be used.

Figure 2:
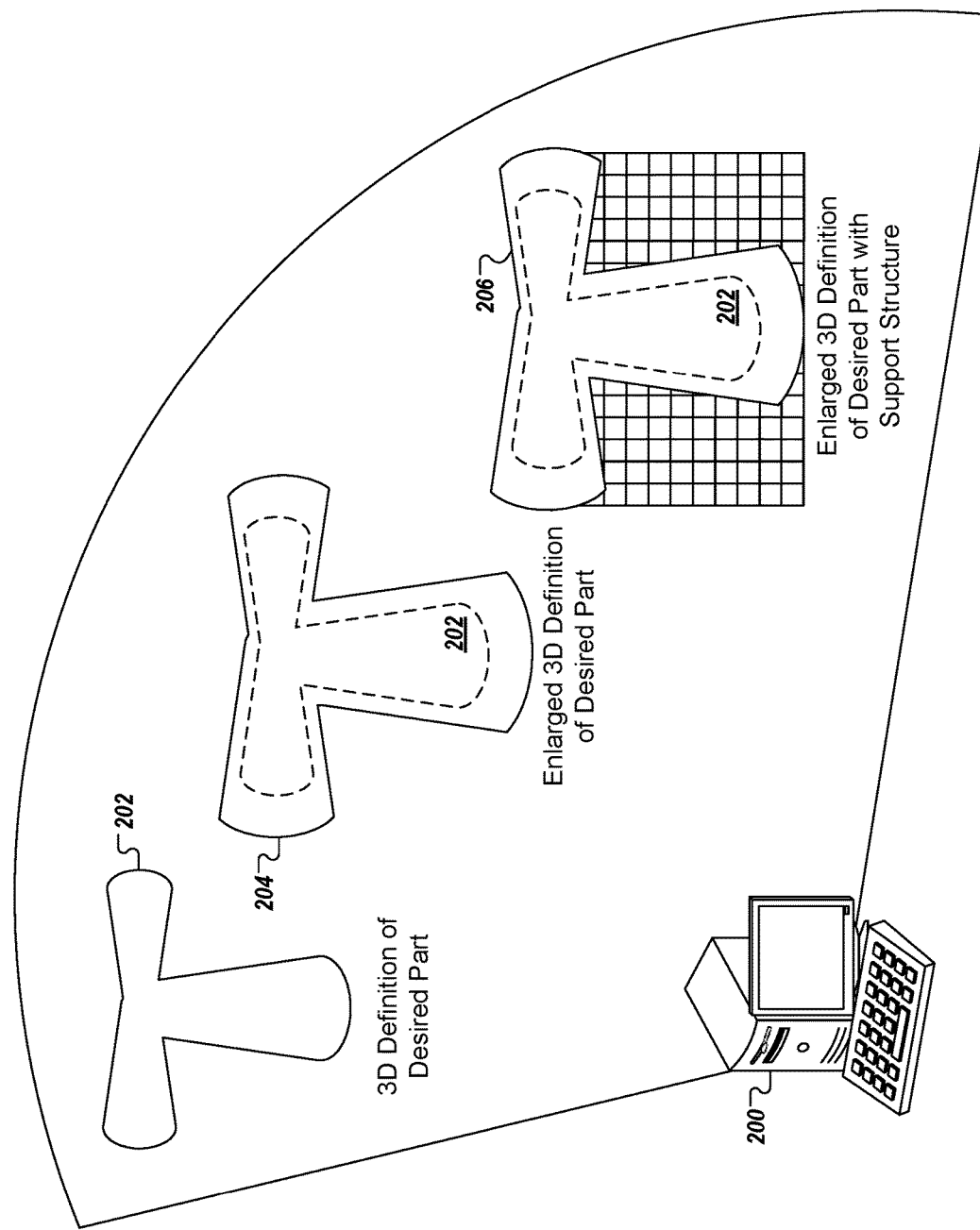
FIG. 2 shows a computer system for designing a build plan for an additive metal deposition process.

FIG. 2 shows an exemplary computer system 200 for designing a build plan for an additive metal deposition process. The computer system 200 may be included in, for example, the computer system 102 described with respect to FIG. 1.

A user of the computer system 200 can create, load, or modify a file or files that contain a 3D definition 202 of a desired part (e.g., a final product of the manufacturing process). For example, the computer system 200 may include a CAD program for designing solid parts. The 3D definition created by the CAD program may specify a set of dimensions for the desired part. These dimensions may be imperial, metric, or another appropriate unit system and may specify sizes and tolerances for the 3D definition 202.

In some implementations, the 3D definition 202 may be created by a user of the computer system 200 controlling the CAD program. The user may draft (e.g., from a blank canvas or a template) the shape of the 3D definition 202. In some implementations, a portion or all of the 3D definition 202 may be input to the computer system 200 from one or more data collection devices. For example, a range finding camera, a coordinate measuring machine, or other measurement devices may be used to collect data about a physical object. That data may be used, for example, as constraints in the generation of the 3D definition 202.

In some implementations, the computer system 200 may be used to create an enlarged 3D definition 204. The enlarged 3D definition 204 may be created to account for the etching process that a build piece will undergo (which can remove a portion of the build piece), once the build piece is created from a build plan for the desired part. In some cases, a user may use the CAD program to create the enlarged 3D definition 204. Alternatively or additionally, custom software unassociated with the CAD program may be used to create the enlarged 3D definition 204. Depending on the configuration of the software used, the enlargement may be shown to a user. For example, the 3D definition 202 may be shown superimposed over the enlarged 3D definition 204. The difference between the two definitions may show the amount of enlargement, visualized as a sacrificial layer.

The computer system 200 and/or a user can calculate the size of the enlargement and/or sacrificial layer based on one or more of factors. In general, at least some of the factors will include those that determine how much material over time will be etched from a build piece 110. These factors can include, but are not limited to, the type of chemical etchant to be used (e.g., pH level, industrial designation, or a particular aqueous solution at a particular concentration), the temperature of the chemical etchant (e.g., room temperature or held at a particular stable or changing temperature), the agitation of the chemical etchant (e.g., by a flow of the etchant, use of a stirrer, or perturbations of a basin holding the etchant), a geometric measure of one or more support structures (e.g., the diameter of a support structure such as at the interface of the support structure), the porosity of the one or more support structures (e.g., as measured or as predicted based on build parameters), a material of the build piece (e.g., according to known reaction rates between a build material and a particular etchant), and a predetermined exposure duration (e.g., minutes or seconds of exposure).

After creating the enlarged 3D definition 204, the computer system 200 can create an enlarged 3D definition with support structure 206. The support structure may be included, for example, to support overhangs and other types of geometry that may otherwise deform, break, or cause problems in a layer-wise manufacturing process. For example, as shown in FIG. 2, the enlarged 3D definition with support structure 206 includes two overhangs. If manufactured layer-wise from the bottom up, the bottom of those overhangs would be disconnected from the central portion of the enlarged 3D definition with support structure 206 when first created. The support structure can be built to support the bottom of those overhangs and hold them in place until the overhangs are fully connected to the central portion of the enlarged 3D definition with support structure 206.

In some implementations, the support structure in the enlarged 3D definition with support structure 206 may be created with extensive user interaction in a CAD or other software package. Alternatively, the support structure in the enlarged 3D definition with support structure 206 may be created in a generally automated fashion without extensive user input. A square grid shape-support structure is shown, but any other appropriate form of support structure may be used.

The enlarged 3D definition with support structure 206 may be sliced into a succession of horizontal slices by the computer system 200 to create a build plan for the enlarged 3D definition with support structure 206. For example, once the enlarged 3D definition with support structure 206 is created, a user can enter parameters of a direct metal printer into computer system 200. One of those parameters may be the depth of each layer that the direct metal printer is capable of operating at. From these and other parameters, the computer system 200 can create a build plan with slices matching the operating depth of the direct metal printer.

Figure 3:
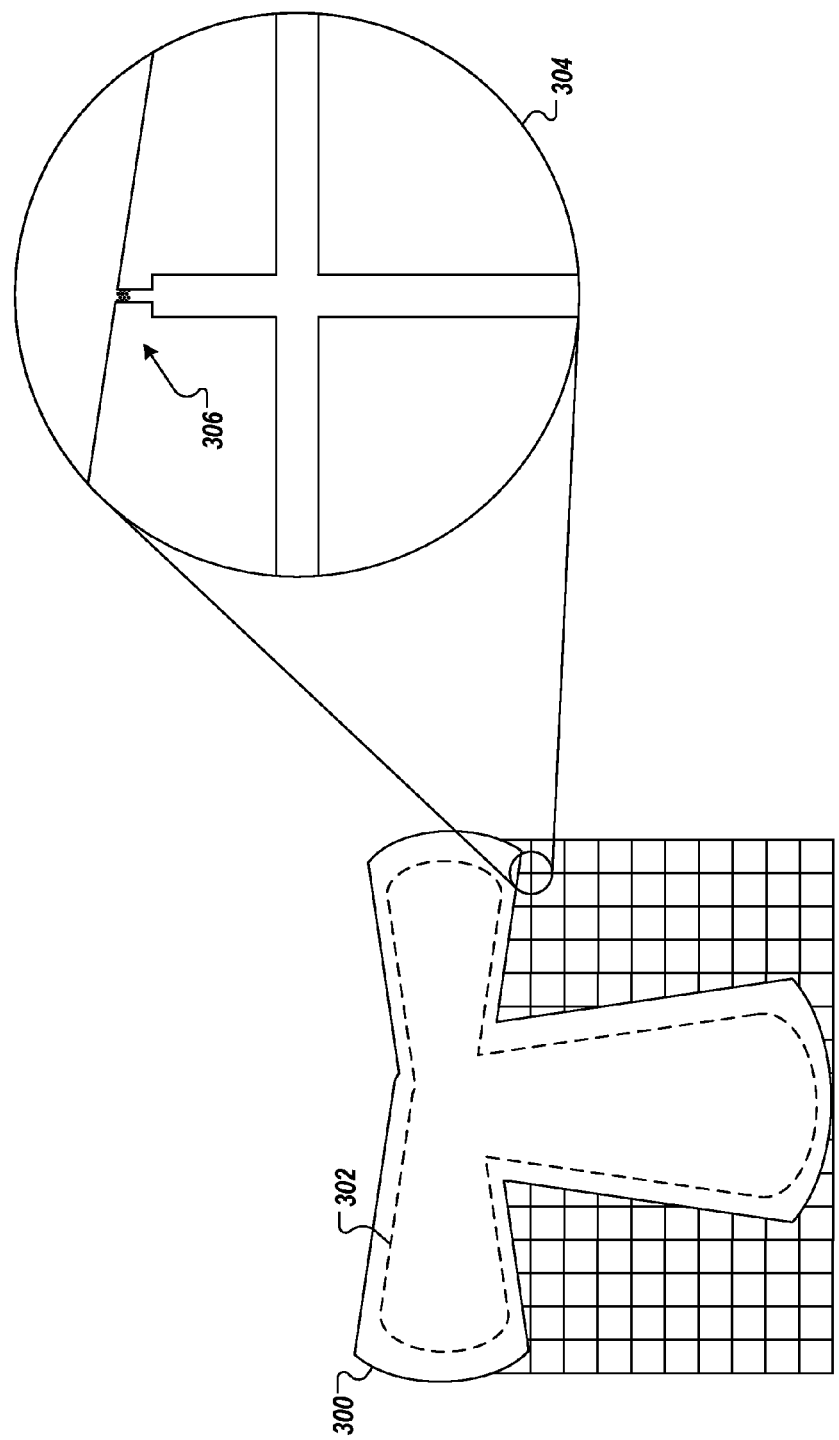
FIG. 3 shows a visual representation of a build plan for an additive metal deposition process.

FIG. 3 shows an exemplary visual representation of build plan 300 for an additive metal deposition process. The build plan 300 may be created, for example, from the enlarged 3D definition with support structure 206. The build plan 300 may be stored on the computer system 200 as data files that conform to the Standard Tessellation Language (STL), Additive Manufacturing File Format (ASTM), Polygon File Format (PLY), or other well-known or custom formats. The build plan may also include other related files, depending on the configuration of the system using the build plan 300.

Shown superimposed over the build plan 300 is the shape 302 of the original desired part, as specified by the 3D definition 202. The difference between the build plan 300 and the 3D definition 202 represents the enlargement applied to create the build plan 300. In some cases, this enlargement may be referred to as a sacrificial layer or a sacrificial thickness. This sacrificial layer or sacrificial thickness may or may not be uniform. For example, enlarging the shape 302 may result in corners that etch at a different speed from flat surfaces and the enlargement may be adjusted to account for this difference. In other cases, if a build plan 300 includes some regular shapes (e.g., a sphere, see FIG. 5), the sacrificial layer or sacrificial thickness may be generally uniform for a given build plan.

The build plan 300, or optionally data at a different stage such as the enlarged 3D definition with support structure 206, can be modified in one or more ways to assist in the removal of the support structure when the corresponding build piece is exposed to an etchant. For example, the detail window 304 in FIG. 3 shows two possible modifications. These modifications may be used separately, alone, and/or with other appropriate modifications.

One modification is a narrowing of the diameter of the support structure at interface 306. The interface 306 is one of the interfaces between the support structure of the build plan 300 and the enlarged 3D definition of the desired part. Other interfaces occur in other locations of the build plan 300, and the modification shown at interface 306 may be repeated at some or all of the other interfaces.

By narrowing the support structure at the interfaces, a support structure can be removed relatively easily from the rest of the build piece when exposed to an etchant. Additionally or alternatively, the narrowing can minimize or eliminate burrs when the support structure is removed.

Another modification shown at the interface 306 is a modification to increase the reactivity of the interface 306 with the etchant. One way to increase the reactivity is to increase the porosity of the material at the interface 306. This may be accomplished, for example, by using built in features of the printing device used. Additionally or alternatively, the build plan specifying that the laser of the direct metal printer work at a lower power, move faster, and/or pulse.

Figure 4:
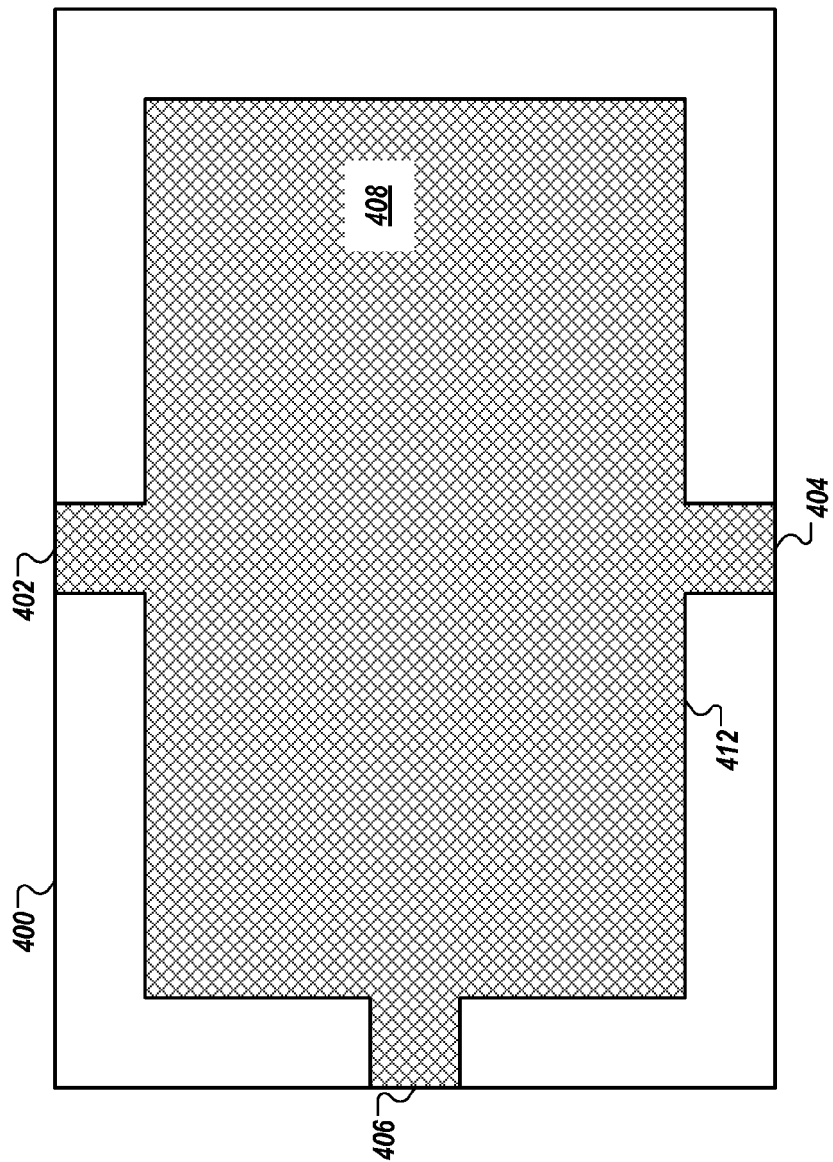
FIG. 4 shows a build piece created by an additive metal deposition process.

FIG. 4 shows a cross-sectional view of an exemplary build piece 400 created by an additive metal deposition process. The build piece 400 may have been created, for example, by the direct metal printer 104 of the system 100, or any other suitable machine, from a build plan that includes support structures and an enlargement of a desired piece.

The build piece 400 may include ports 402-406 and an enclosed cavity 408. The enclosed cavity 408 is connected to the ports 402-406 such that a fluid (e.g., a chemical etchant) could flow into the cavity 408 if the build piece 400 were to be submerged in the fluid.

To support the build piece 400 as it is being manufactured, the cavity 408 includes a support structure 412. This support structure may be necessary, for example, to support the overhangs created by manufacturing the build piece 400 in a layer-wise process. In some implementations, the ports 402-406 may have supports structures as well. During the manufacturing process, it is possible that powdered metal or other appropriate build media may become trapped in the cavity 408, even if that powder is never solidified by the direct metal printer that manufactures the build piece 400.

Figure 5:
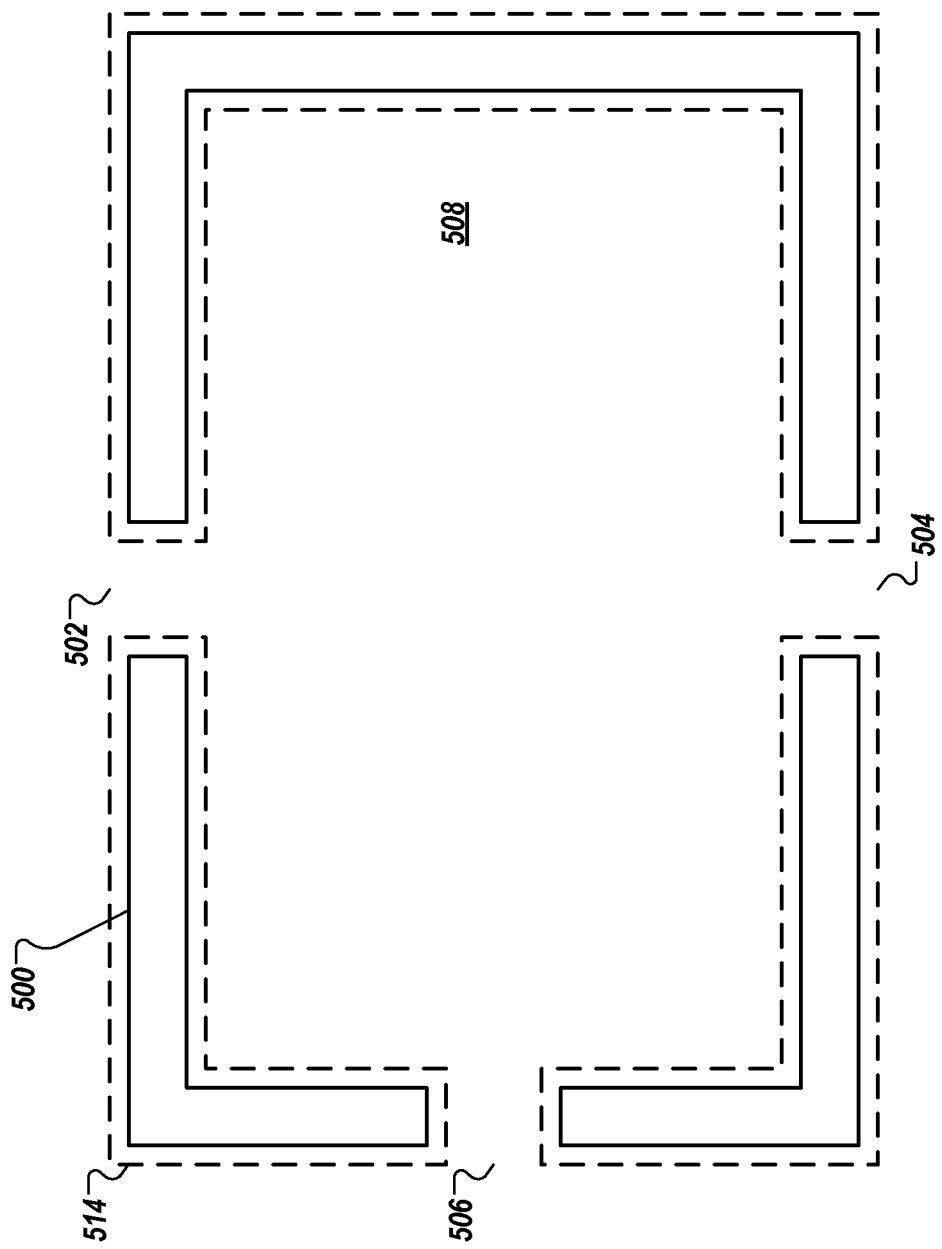
FIG. 5 shows the build piece after it has been subjected to a chemical etchant.

FIG. 5 shows a cross-sectional view of the build piece 500 after the build piece 400 has been subjected to a chemical etchant. For example, to obtain build piece 500, a human or robotic operator can remove the build piece 400 from the direct metal printer, place the build piece 400 in an etchant bath for a predetermined period of time, and then remove the build piece 400 from the etchant bath.

The original size of the build piece 500 is shown by reference line 514. As shown in FIG. 5, the overall size of the build piece 500 has been reduced by the etchant treatment and is smaller than that of the build piece 400. Furthermore, the internal wall thickness the enclosed cavity 408 of the build piece 400 has been reduced to form an enclosed cavity 508. Similarly, the ports 402-406 of the build piece 400 have been enlarged to form ports 502-506 due to the exposure to the etchant.

When the build piece 400 is subjected to the chemical etchant, the etchant is able to enter cavity 408 via the ports 402-406. As a result, the etchant is able to remove the support structures from the cavity, along with any powdered media that is left in the cavity 408, to form an empty cavity 508.

In some implementations, the surface of the build piece 400 has also been improved by exposure to the chemical etchant. For example, some direct metal manufacturing techniques produce a 'stair-step' artifact on build pieces, and the exposure to the etchant can remove or reduce this artifact. As another example, the etchant can smooth the surface of the build piece 400, resulting in a surface smoother than what is produced or what is possible with only the direct metal printer. For example, a titanium surface ma by taken from a 350 Ra finish to a 200 Ra finish.

After exposure to the etchant, the build piece 500 can be subjected to additional finishing and processing. For example, the ports 502-506 may be tapped to accept screws, or the surface of the build piece 500 may be further polished. In some cases, the build piece 500, after being exposed to the etchant, may be of the size and shape, or within tolerances thereof, of the desired part (e.g., the final product of the manufacturing process). In some other cases, the build piece 500 may need further processing to reach the size and shape of the desired part.

Figure 6:
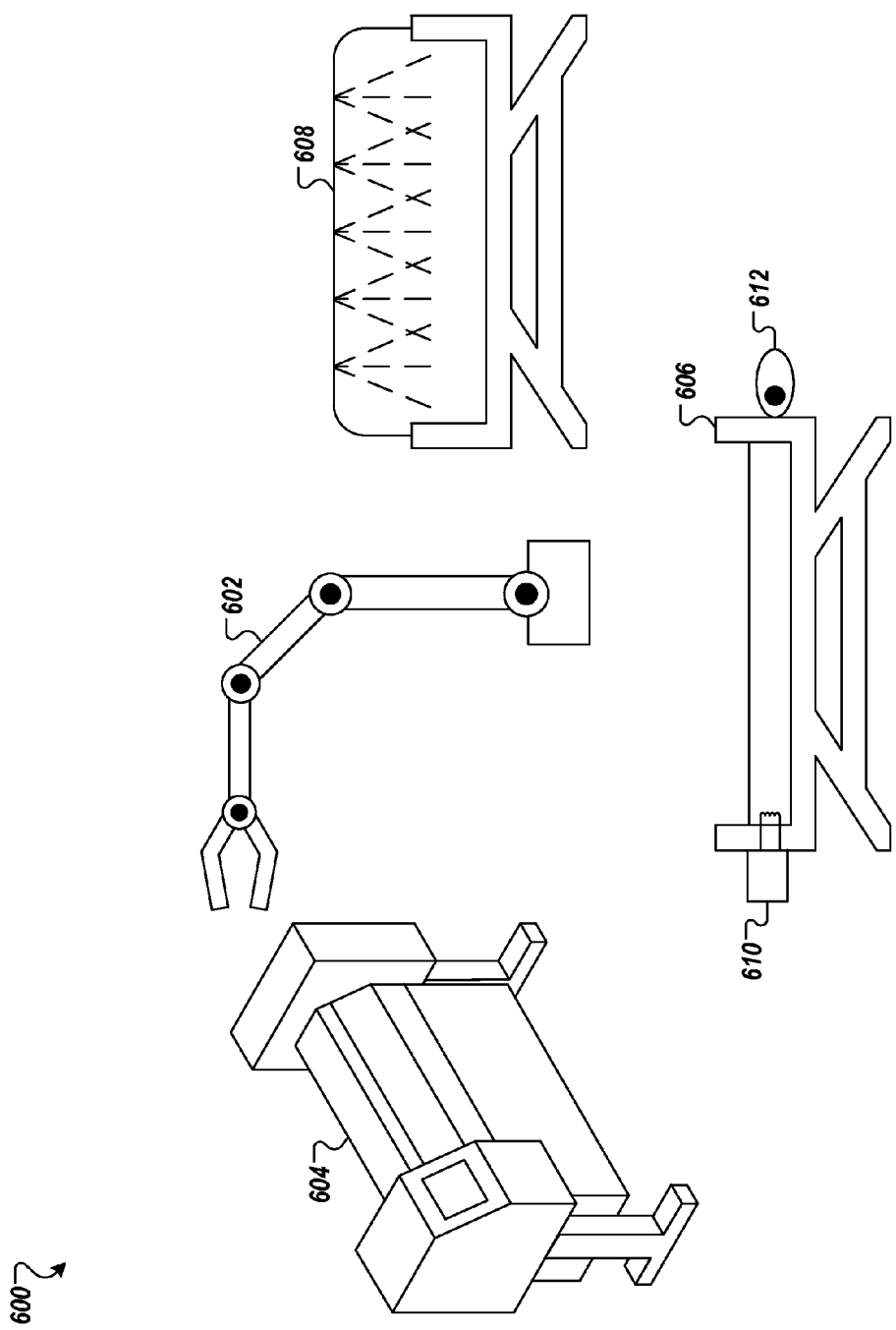
FIG. 6 shows an automated system for processing pieces created via an additive metal deposition process.

FIG. 6 shows an exemplary automated system 600 for manufacturing and processing pieces created via an additive metal deposition process. The manufacturing and processing of pieces can have any appropriate level of automation applied. Shown here is a highly automated system that may be appropriate for integration in manufacturing line or as a manufacturing cell. The system 600 includes a material handling robot 602, a direct metal printer 604, an etchant bath 606, and a washing station 608. Equipment not shown, but possibly included in the automated system 600, includes but is not limited to material handling machines such as convey belts and storage bins, verification and validation equipment such as proximity sensors, cameras, and scales, safety equipment such as light curtains and emergency stops, and control and reporting devices such as computing terminals, programmable logic controllers, and data networking equipment.

In the automated system 600, the direct metal printer 604 can print one or more build pieces. Once completed, the material handling robot 602 can remove the build pieces and place them in the etchant bath 606. In some cases, the temperature of the etchant can be controlled by a temperature module 610. The temperature module 610 may include, for example, a heating element and or cooling element submerged in the etchant or embedded in the basin of the etchant bath 606. The heating element may be engaged to heat the etchant and/or the cooling element may be engaged to cool the etchant. The temperature module 610 may also include a thermocouple or other heat sensing device to monitor the temperature of the etchant or, for example, a proxy temperature such as the basin of the etchant bath 606. When the thermocouple reads below a threshold temperature, the temperature module 610 can engage the heating element, thus maintaining at least the threshold temperature in the etchant. In another configuration, the temperature module 610 can engage the heating element according to a duty cycle predetermined to keep the etchant at or around a particular desired temperature. In one example, ferric chloride may be held at 120 to 150 degrees Fahrenheit. In another example, etched titanium, which produces heat, may be cooled to remain under 100 degrees Fahrenheit.

In addition to controlling the temperature of the etchant, the etchant bath 606 can control the agitation of the etchant on the build pieces. For example, the etchant bath can include a shaker table or offset cam 612. When the offset cam is rotated, the basin of the etchant bath 606, and thus the etchant and submerged build pieces, can be agitated. The etchant bath 606 can control the rate of agitation, for example, by controlling the speed at which the offset cam is rotated. Although not shown, other methods of controlling agitation are possible. For example, one or more propellers may be submerged in the etchant and engaged by the etchant bath 606 to create agitation.

After the build pieces have been exposed to the etchant for a determined amount of time, the material handling robot 602 can move the build pieces to the washing station 608. The washing station 608 can wash the etchant from the build piece with one or more appropriate washing fluids, including but not limited to water and/or caustic soda. In some cases, the duration of exposure to the etchant can be predetermined according to one or more factors. In general, at least some of the factors will include those that determine how much material over time will be etched from the build pieces. These factors can include, but are not limited to, the type and concentration of chemical etchant to be used (e.g., acidic or basic, the temperature of the chemical etchant (e.g., room temperature or held at a particular stable or changing temperature), the agitation of the chemical etchant (e.g., by a flow of the etchant, use of a stirrer, or perturbations of a basin holding the etchant), a geometric measure of one or more support structures (e.g., the diameter of a support structure such as at the interface of the support structure), the porosity of the one or more support structures (e.g., as measured or as predicted based on build parameters), a material of the build piece (e.g., according to known reaction rates between a build material and a particular etchant).

Once the washing station 608 receives the build pieces, the washing station 608 can wash the etchant off the build pieces. For example, the washing station 608 can include jets or sprinklers to wash the etchant off with a rinse solvent (e.g., water, a non-reactive fluid, or a fluid that reacts with the etchant to neutralize the etchant). After being washed, the material handling robot 602 may remove the now etched and washed build pieces for further processing, inspection, packaging, etc.

Figure 7:
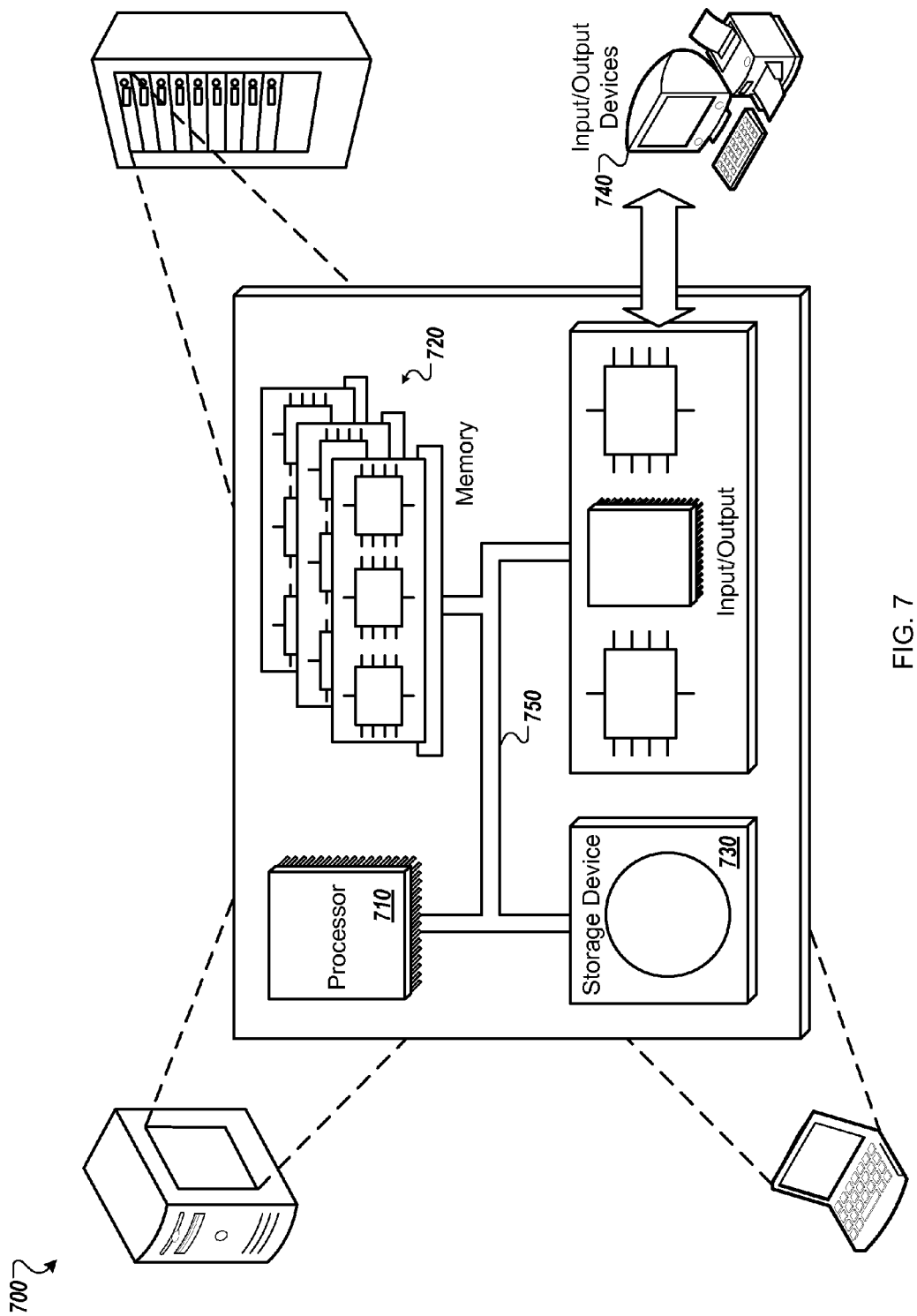
FIG. 7 is a schematic diagram that shows an example of a computing system.

FIG. 7 is a schematic diagram that shows an example of a computing system 700. The computing system 700 can be used for some or all of the operations described previously. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method, comprising:
   receiving, by a computer system having a processor and computer memory, a three-dimensional definition of a desired part;
   determining a sacrificial thickness around the desired part to be removed by an etching process based on at least one etch factor;
   generating, by the computer system, a build plan having a first set of dimensions by enlarging the three-dimensional definition of the desired part by the sacrificial thickness to be removed;
   creating a build piece from the build plan by an additive metal deposition process; and
   applying the etching process, comprising subjecting the build piece to a chemical etchant such that the dimensions of the build piece corresponding to the desired part are reduced to a second set of dimensions.

2. The method of claim 1, the method further comprising:
   removing the etchant from the part; and
   finishing the part by applying at least one finishing process to the part after removing the etchant from the part.

3. The method of claim 1, wherein the build piece further comprises one or more support interfaces.

4. The method of claim 3, wherein subjecting the build piece to a chemical etchant removes the support interfaces.

5. The method of claim 1, wherein subjecting the build piece to a chemical etchant comprises controlling a temperature of the chemical etchant.

6. The method of claim 1, wherein subjecting the build piece to a chemical etchant comprises agitating the chemical etchant.

7. The method of claim 1, wherein the chemical etchant etches a support structure of the build piece faster than the rest of the build piece.

8. The method of claim 7, wherein the support structure has greater porosity than the rest of the build piece.

9. The method of claim 7, wherein the build piece further comprises one or more support interfaces that is narrower than the support structure.

10. The method of claim 1, wherein the build piece contains a cavity and a port, at least a portion of a support structure of the build piece is created in the cavity, and the chemical etchant reaches the portion of the support structure in the cavity by entering the cavity through the port.

11. The method of claim 1, wherein subjecting the build piece to a chemical etchant comprises subjecting the build piece to a chemical etchant for a determined exposure duration; and
   wherein the method further comprises determining the exposure duration from the at least one etch factor, the etch factor being selected from the group consisting of a type of chemical etchant, a temperature of the chemical etchant, an agitation of the chemical etchant, a geometric measure of a support structure of the build piece, an etchant reactivity of the support structure, a porosity of the support structure, and a material of the build piece.

12. The method of claim 1, wherein the build piece is made from a material selected from the group consisting of steel, stainless steel, and Inconel; and the etchant is ferric chloride with HCl.

13. The method of claim 1, wherein the build piece is made from titanium and the etchant is hydrofluoric or hydrochloric acid.

14. The method of claim 1, wherein the build piece is subjected to the etchant by an automated material handler in response to a detection that the build piece has been created.

15. The method of claim 1, wherein subjecting the build piece to the chemical etchant increases surface smoothness of the build piece.

16. The method of claim 1, wherein the second set of dimensions are the three-dimensional definition of the desired part.

17. An article of manufacture created by a method of claim 1.

18. The article of manufacture of claim 17, the method further comprising:
removing the etchant from the part; and
finishing the part by applying at least one finishing process to the part after removing the etchant from the part.

19. The article of manufacture of claim 17, wherein the build piece further comprises one or more support interfaces.

20. The article of manufacture of claim 19, wherein subjecting the build piece to a chemical etchant removes the support interfaces.

21. The article of manufacture of claim 17, wherein subjecting the build piece to a chemical etchant comprises controlling a temperature of the chemical etchant.

22. The article of manufacture of claim 17, wherein subjecting the build piece to a chemical etchant comprises agitating the chemical etchant.

23. The article of manufacture of claim 17, wherein the chemical etchant etches a support structure of the build piece faster than the rest of the build piece.

24. The article of manufacture of claim 23, wherein the support structure has greater porosity than the rest of the build piece.

25. The article of manufacture of claim 23, wherein the build piece further comprises one or more support interfaces that is narrower than the support structure.

26. The article of manufacture of claim 17, wherein the build piece contains a cavity and a port, at least a portion of a support structure of the build piece is created in the cavity, and the chemical etchant reaches the portion of the support structure in the cavity by entering the cavity through the port.

27. The article of manufacture of claim 17, wherein subjecting the build piece to a chemical etchant comprises subjecting the build piece to a chemical etchant for a determined exposure duration; and
wherein the method further comprises determining the exposure duration from the at least one etch factor, the etch factor being selected from the group consisting of a type of chemical etchant, a temperature of the chemical etchant, an agitation of the chemical etchant, a geometric measure of a support structure of the build piece, an etchant reactivity of the support structure, a porosity of the support structure, and a material of the build piece.

28. The article of manufacture of claim 17, wherein the build piece is made from a material selected from the group consisting of steel, stainless steel, and Inconel; and the etchant is ferric chloride with HCl.

29. The article of manufacture of claim 17, wherein the build piece is made from titanium and the etchant is hydrofluoric or hydrochloric acid.

30. The article of manufacture of claim 17, wherein the build piece is subjected to the etchant by an automated material handler in response to a detection that the build piece has been created.

31. The article of manufacture of claim 17, wherein subjecting the build piece to the chemical etchant increases surface smoothness of the build piece.

* * * * *